United States Patent
Chambers et al.

(10) Patent No.: US 11,673,570 B2
(45) Date of Patent: Jun. 13, 2023

(54) VEHICLE DRIVING BEHAVIOR MONITORING AND WARNING SYSTEM

(71) Applicant: Nissan North America, Inc., Franklin, TN (US)

(72) Inventors: Jeremy Chambers, Casco, MI (US); Roy Goudy, Farmington Hills, MI (US); Neal Probert, Beverly Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 121 days.

(21) Appl. No.: 17/240,885

(22) Filed: Apr. 26, 2021

(65) Prior Publication Data

US 2022/0340158 A1  Oct. 27, 2022

(51) Int. Cl.
  *B60W 50/14* (2020.01)
  *B60W 30/095* (2012.01)

(52) U.S. Cl.
  CPC ........ *B60W 50/14* (2013.01); *B60W 30/0956* (2013.01); *B60W 2050/146* (2013.01); *B60W 2554/4041* (2020.02); *B60W 2554/4046* (2020.02); *B60W 2556/60* (2020.02); *B60W 2556/65* (2020.02)

(58) Field of Classification Search
  CPC ............. B60W 50/14; B60W 30/0956; B60W 2554/4041; B60W 2556/65; B60W 2556/60; B60W 2554/4046; B60W 2050/146
  See application file for complete search history.

(56) References Cited

U.S. PATENT DOCUMENTS

| 7,486,199 | B2 | 2/2009 | Tengler et al. |
| 8,854,198 | B2 | 10/2014 | Tengler et al. |
| 10,032,379 | B1 * | 7/2018 | Chambers .............. G08G 1/162 |
| 10,762,786 | B1 * | 9/2020 | Dewey .................. B60W 30/09 |
| 2009/0085774 | A1 | 4/2009 | Yasuhara et al. |
| 2009/0096598 | A1 | 4/2009 | Tengler et al. |

(Continued)

FOREIGN PATENT DOCUMENTS

| CN | 105109340 A | 12/2015 |
| CN | 111278704 A * | 6/2020 ................ A23J 1/10 |

*Primary Examiner* — Chico A Foxx
(74) *Attorney, Agent, or Firm* — Global IP Counselors, LLP

(57) ABSTRACT

A vehicle driving behavior monitoring and warning system that includes a host vehicle having a communication device that receives operating information of remote vehicles that are located within a predetermined zone of interest, a warning device and an electronic controller. The electronic controller is connected to the communication device and the warning device. The electronic controller evaluates operating information received by the communication device and determine whether or not one of the remote vehicles is operating with questionable driving behavior and determines whether or not the remote vehicle poses a potential threat to the host vehicle. In response to determining that the remote vehicle is operating with questionable driving behavior and poses a potential threat to the host vehicle, the electronic controller operates the warning device warning the operator of the host vehicle of the remote vehicle.

15 Claims, 9 Drawing Sheets

(56) References Cited

U.S. PATENT DOCUMENTS

| | | | |
|---|---|---|---|
| 2011/0231096 A1* | 9/2011 | Ridenour, II | G08G 5/06 |
| | | | 701/301 |
| 2013/0015983 A1 | 1/2013 | Goudy et al. | |
| 2014/0244104 A1 | 8/2014 | Tan | |
| 2014/0249718 A1 | 9/2014 | Liu et al. | |
| 2015/0123778 A1* | 5/2015 | Konet | G08G 1/166 |
| | | | 340/435 |
| 2015/0254977 A1* | 9/2015 | Grabow | G08G 1/0141 |
| | | | 340/903 |
| 2015/0254982 A1* | 9/2015 | Goudy | G08G 1/166 |
| | | | 340/435 |
| 2015/0256534 A1* | 9/2015 | Goudy | H04W 12/033 |
| | | | 713/156 |
| 2015/0345977 A1 | 12/2015 | Saito et al. | |
| 2015/0360601 A1* | 12/2015 | Chambers | B60Q 1/085 |
| | | | 701/49 |
| 2016/0071417 A1* | 3/2016 | Lewis | G08G 1/162 |
| | | | 701/301 |
| 2016/0291149 A1* | 10/2016 | Zeng | G01S 13/931 |
| 2017/0113665 A1* | 4/2017 | Mudalige | G08G 1/166 |
| 2017/0151944 A1* | 6/2017 | Al-Stouhi | B60W 30/09 |
| 2017/0221363 A1* | 8/2017 | Goudy | G08G 1/166 |
| 2017/0247028 A1* | 8/2017 | Goudy | B60W 30/095 |
| 2017/0274820 A1* | 9/2017 | Goudy | G08G 1/163 |
| 2017/0274821 A1* | 9/2017 | Goudy | G08G 1/167 |
| 2019/0369644 A1* | 12/2019 | Goudy | G08G 1/0137 |
| 2020/0377016 A1 | 12/2020 | Probert et al. | |
| 2020/0406815 A1 | 12/2020 | Chambers et al. | |
| 2021/0316750 A1* | 10/2021 | Jo | B60W 50/14 |
| 2022/0111867 A1* | 4/2022 | Trask | B60W 50/14 |

* cited by examiner

VEHICLE DRIVING BEHAVIOR MONITORING AND WARNING SYSTEM

BACKGROUND

Technical Field

The present disclosure generally relates to a system for warning a vehicle operator of a host vehicle of the presences of a nearby vehicle (a remote vehicle) that is being operated by a driver exhibiting questionable driving behavior. More specifically, the present disclosure relates to system in a host vehicle that monitors the driving behavior of nearby remote vehicles, determine whether or not one or more of the remote vehicles is being operated with questionable driving behavior, and warn the driver of the host vehicle of remote vehicle being operated with the questionable driving behavior.

Background Information

Many vehicles having systems that are capable of receiving position and speed related information of other vehicles from, for example, a global positioning satellite system (GPS system) and/or a Dedicated Short-Range Communications system (DSRC). Such information is used by a host vehicle to determine location and heading of the host vehicle. Such information can also be used to determine the location and heading of other vehicles.

SUMMARY

One object of the present disclosure is to provide a vehicle with a monitoring system that determines whether or not a nearby remote vehicle is exhibiting questionable driving behavior and if so, warn the operator of a host vehicle of a possible threat posed by the questionable driving behavior of the remote vehicle.

In view of the state of the known technology, one aspect of the present disclosure is to provide a host vehicle with a vehicle driving behavior monitoring and warning system that includes a communication device, a warning device and an electronic controller. The communication device is configured to receive operating information of remote vehicles located within a predetermined zone of interest defined relative to the host vehicle. The warning device is within the host vehicle and is operable to provide warnings to an operator of the host vehicle. The electronic controller of the host vehicle is connected to the communication device and the warning device. The electronic controller is configured to evaluate operating information received by the communication device and determine whether or not one of the remote vehicles is being operated with questionable driving behavior. The electronic controller is further configured to determine whether or not the one of the remote vehicles poses a potential threat to the host vehicle. In response to determining that the one of the remote vehicles is being operated with questionable driving behavior and poses a potential threat to the host vehicle, the electronic controller operates the warning device warning the operator of the host vehicle of the one of the remote vehicles.

Also other objects, features, aspects and advantages of the disclosed vehicle driving behavior monitoring and warning system will become apparent to those skilled in the art from the following detailed description, which, taken in conjunction with the annexed drawings, discloses exemplary embodiments of the collision warning system and method.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
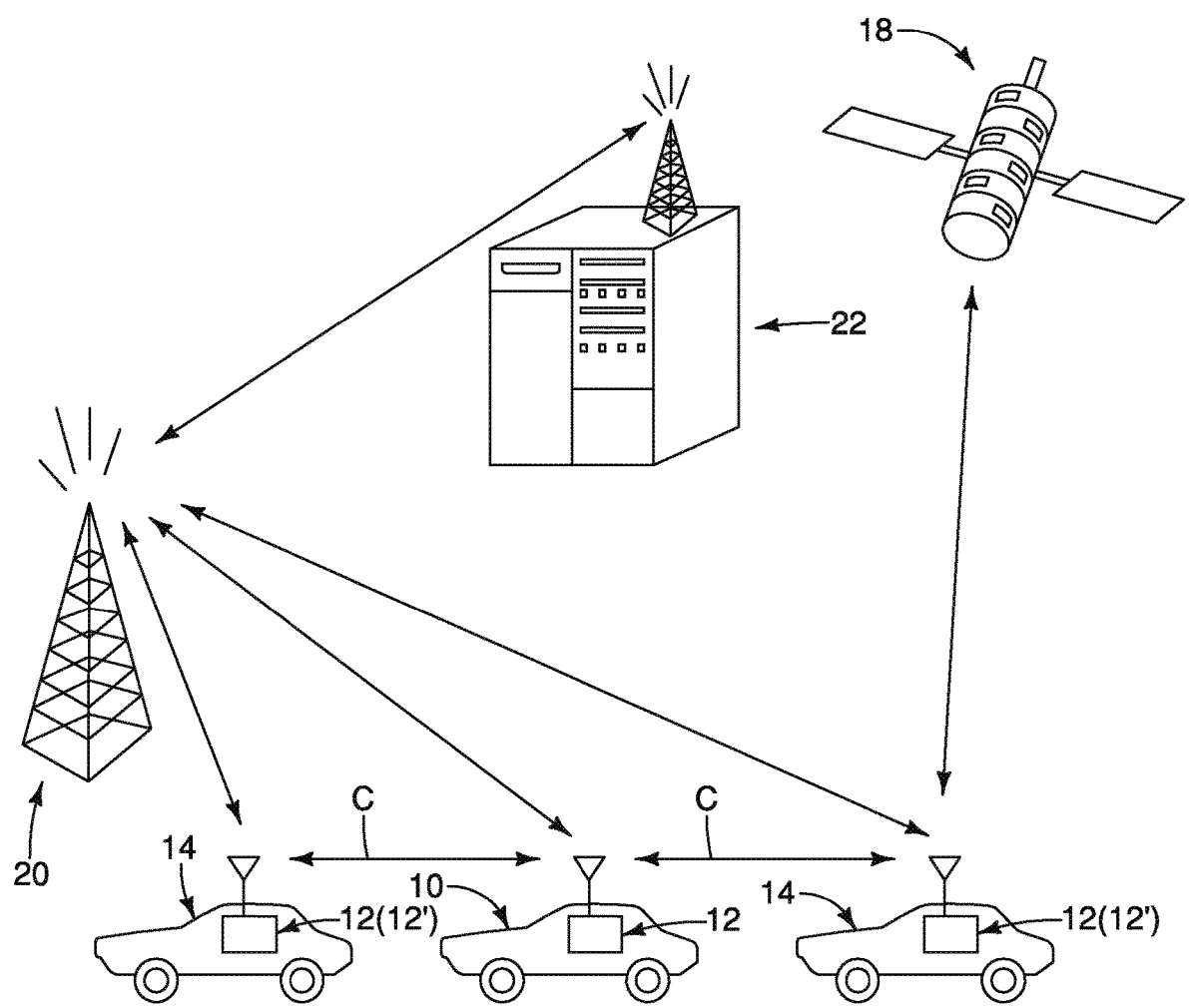
FIG. 1 is a schematic diagram illustrating a host vehicle equipped with a vehicle driving behavior monitoring and warning system (hereinafter the monitoring system) that monitors the driving behavior of nearby remove vehicles in accordance with an exemplary embodiment.

Referring initially to FIG. 1, a host vehicle 10 having a vehicle driving behavior monitoring and warning system 12 (hereinafter the monitoring system 12) is depicted in accordance with an exemplary embodiment.

As is also shown in FIG. 1, the monitoring system 12 is configured to communicate with, for example, a two-way wireless communications network that can include a one or more global positioning satellites 18 (only one shown), and one or more roadside (terrestrial) communication units 20 (only one shown), and a base station or external server 22 (only one is shown). Hence, the monitoring system 12 can be configured for vehicle to base station and base station to vehicle communications (communication units 20), vehicle to satellite and satellite to vehicle based communications (such as the global positioning satellite 18) and can further be configured for direct vehicle to vehicle communication, as indicated by arrows C.

While the host vehicle 10 and the remote vehicles 14 are illustrated as having the same monitoring system 12, it will be apparent from this disclosure that each of the remote vehicles 14 are not required to have the monitoring system 12 but can alternatively have another monitoring system 12' that can be a simplified configuration, or, a somehow differing configuration, as compared to the monitoring system 12 of the host vehicle 10, depending upon the vehicle and system design.

The two-way communication system depicted in FIG. 1 is configured to receive and transmit operating information between one or both of the remote vehicles 14 and the host vehicle 10. The operating information can include, for example, information representing the location (e.g., GPS location), speed, acceleration, heading and steering wheel angle of each of the remote vehicles 14 at each of a plurality of locations of the remote vehicles 14, and other types of information that represent operating information of the remote vehicles 14, as explained in greater detail below. The host vehicle 10 can also exchange its operating information with each respective remote vehicles 14. The operating information of the host vehicle 10 can include, for example, information representing the location (e.g., GPS location), speed, acceleration, heading, and steering wheel angle of the host vehicle 10 at each of a plurality of locations of the host vehicle 10, and any other type of information suitable for representing positional information and operating information of the host vehicle 10. The host vehicle 10 and the respective first and second remote vehicles 14 can exchange this type of host vehicle operating information and remote vehicle operating information with each other several times per second, or at any suitable time intervals, as is described in greater detail below.

An exemplary type of vehicle to vehicle C communication is a basic safety message (BSM) system, which can be broadcast by many vehicles, including the host vehicle 10 and the remote vehicles 14. The BSM is received by other vehicles located within a predetermined distance (aka zone of interest) of the transmitting vehicle. The BSM is a packet of data that includes operating information about the position, heading, speed, identification, steering wheel angle, and optionally other information relating to operating information of the transmitting vehicle. The BSM is transmitted by the transmitting vehicle (i.e. the host vehicle 10 and/or the remote vehicles 14) at a predetermined frequency. The BSM transmitted by the transmitting vehicle is received by a wireless communication system or wireless communication device of the monitoring system 12 or 12' of any receiving vehicle within the predetermined distance of the transmitting vehicle. It should be understood from the drawings and the description herein that the host vehicle 10 and each of the remote vehicles 14 can be both a receiving vehicle and a transmitting vehicle as defined and described above.

The monitoring system 12 of the host vehicle 10 and the remote vehicles 14 communicate with the global positioning satellites 18 and/or the roadside units 20 of the two-way wireless communications network. Further, the monitoring system 12 can receive and transmit operating information (data) to and from the host vehicle 10 and the remote vehicles 14. The base station 22 can transmit and receive signals to and from the monitoring system 12 of the host vehicle 10 and the first and second remote vehicles 14 via a network of the roadside units 20, or any other suitable two-way wireless communications network.

Figure 2:
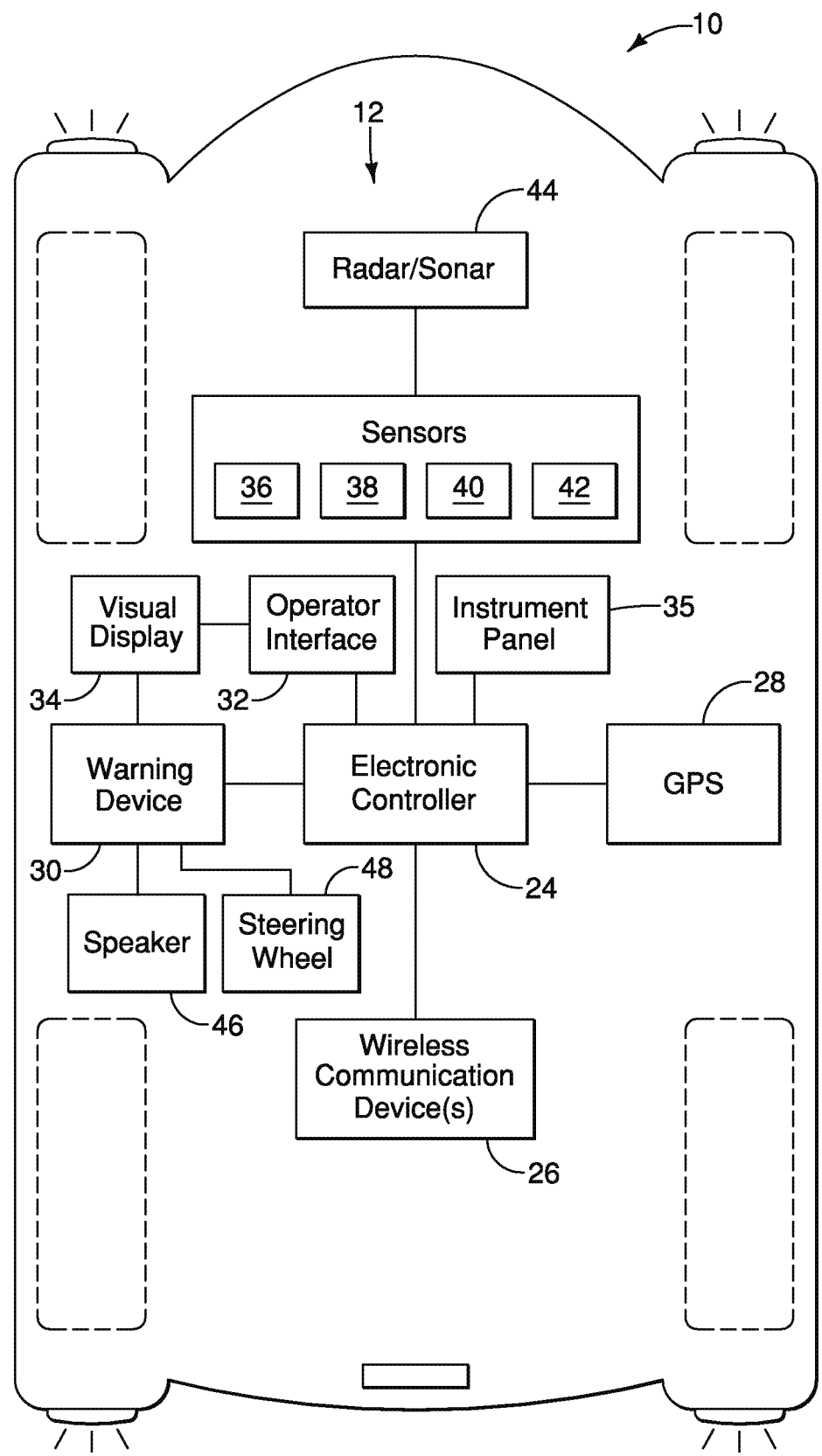
FIG. 2 is a block diagram of components of the monitoring system and related elements the host vehicle depicted in FIG. 1 in accordance with the exemplary embodiment.

As shown in FIG. 2, the monitoring system 12 of the host vehicle 10 includes an electronic controller 24, a wireless communication device 26 (or devices 26), GPS device 28 (global positioning satellite device 28), a warning device 30, an operator interface 32 with an optional display 34, a plurality of sensors 36, 38, 40 and 42 and a radar/sonar device 44.

The electronic controller 24 that can be referred to simply as the controller 24. The electronic controller 24 preferably includes a microcomputer with a control program that controls the components of the monitoring system 12, as described further below. The electronic controller 24 includes other conventional components such as an input interface circuit, an output interface circuit, and storage devices such as, for example, a ROM (Read Only Memory) device and a RAM (Random Access Memory) device, a hard drive, electronic memory, EPROM, or other long term and short term information storage media. The microcomputer of the controller 24 is at least programmed to control the monitoring system 12 in accordance with the flow chart of FIGS. 3 and 4, as described further below. It will be apparent to those skilled in the art from this disclosure that the precise structure and algorithms for the controller 24 can be any combination of hardware and software that will carry out the functions of the present invention. Furthermore, the controller 24 can communicate with the other components of the collision monitoring system 12 discussed herein via, for example a controller area network (CAN) bus or in any other suitable manner as understood in the art.

The electronic controller 24 of the host vehicle 10 is in electrical communication and/or directly connected to the communication device 26 and the warning device 30. The electronic controller 24 is configured to evaluate operating information received by the communication device 26 and determine whether or not one of the remote vehicles 14 is being operated with questionable driving behavior (also referred to as unstable driving profile). The electronic controller 24 is further configured to determine whether or not one or more of the remote vehicles 14 poses a potential threat to the host vehicle 10. The electronic controller 24 is further configured such that in response to determining that the one of the remote vehicles 14 is being operated with questionable driving behavior and poses a potential threat to the host vehicle, the electronic controller 24 operates the warning device 30 in order to warn the operator of the host vehicle 10 of the potential thread of the one of the remote vehicles 14.

While the host vehicle 10 is being operated, the electronic controller 24 of the host vehicle 10 is configured to continuously evaluate operating information received by the communication device 26 in order to categorize driving behavior of each of the remote vehicles 14 located within a predetermined area around the host vehicle 10. Specifically, the electronic controller 24 evaluates at least two of the following for each of the remote vehicles 14 based on operating information received via the communication device 26. The operating information includes but is not limited to: magnitude and frequency of acceleration; magnitude and frequency of braking operation; current speed; and magnitude and frequency of steering corrections. The operating information can further include data regarding vehicle dynamic state including but not limited to, vehicle position in latitude and longitude, elevation and heading.

The evaluated operating information can yield many, and in most circumstances, all of the following for each of the remote vehicles 14: number of steering corrections per minute; number of braking operations per minute; vehicle speed relative to speed limit of road and the speed of the host vehicle 10; number of lane changes per minute; number of side-to-side meanderings with a lane per minute; proximity to lane divider lines; and duration and number of occurrences of tailgating per minute. In the above, reference is made to occurrences per minute. It should be understood from the drawings and the description herein that the actual time period for measuring occurrences is not a fixed value but can be any statistically meaningful time period, and, can be correlated to speed of the evaluated vehicle. For instance, the number occurrences any or all of the above at 30 miles per hour may be of more or less significance that the number of occurrences at a speed of 60 miles per hour, where the number of occurrences of questionable behavior is used to make a determination of a remote vehicle being designated as a threat to the host vehicle 10.

A determination of questionable driving behavior can be made in any time period between 1 and 20 seconds (time per time period or ptp being 1-20 seconds). For example, electronic controller 24 is configured to give consideration to the following: too many steering corrections ptp; too many braking operations ptp; too many hard braking operations ptp; too many large changes in acceleration/deceleration ptp; duration of excessive speed relative to speed limit and/or speed of other remote vehicles ptp; too much lane meandering ptp; and/or continuous tailgating or repeated instances of tailgating ptp.

The electronic controller 24 can also be configured to take in consideration the type of remote vehicle 14, where the remote vehicles 14 can be, for example, a motorcycle, a small car, a sports car, a muscle car, a medium sized passenger vehicle, a large car, a small truck, an SUV, a large truck or a tractor trailer. Specifically, larger vehicle can pose a greater threat in many circumstances due to the size and weight of cargo within the larger vehicle, as compared to a smaller vehicle.

The electronic controller 24 is also configured to categorize the driving behavior of each remote vehicle 14 within the zone of interest into one of three categories, including a cleared category, a continue monitoring category and a potential threat category. The electronic controller 24 lists one or more of the remote vehicles 14 in the cleared category in response to determining that one or more of the remote vehicles 14 poses/pose little or no potential threat to the host vehicle. The electronic controller 24 lists one or more of the remote vehicles 14 in the continue monitoring category in response to determining that one or more of the remote vehicles 14 is/are moving in a similar or the same heading as the host vehicle and exhibits occasional questionable driving behavior. The electronic controller 24 categorizes one or more of the remote vehicle 14 in the potential threat category in response to the electronic controller 24 determining that the remote vehicle 14 exhibits continuing questionable driving behavior and is traveling on a similar or intersecting heading as the host vehicle 10 within the zone of interest. For purposes of demonstration only, once one of the remote vehicles 14 is designated as exhibiting continuing questionable driving behavior and in on a similar or intersecting heading, it is identified herein as a first remote vehicle 14A as shown in FIGS. 12-17.

During the evaluation of remote vehicles 14 within the zone of interest as shown in FIGS. 12-17, the electronic controller 24 of the host vehicle 10 continuously evaluates the operating information receive to: determine whether or not the first remote vehicle 14A continues to be operated with questionable driving behavior; determining whether or not the first remote vehicle 14a poses a potential threat to the host vehicle, and, in response to determining that the first remote vehicle 14A is being operated with questionable driving behavior and determining that the first remote vehicle 14A poses a potential threat to the host vehicle, the electronic controller 24 operates the warning device informing the operator of the host vehicle 10 that the first remote vehicle 14A is being operated with the questionable driving behavior and is a potential threat to the host vehicle 10.

The wireless communication device 26 (or devices 26) can include, for example, a transmitter, a receiver, a transceiver, and any other suitable type of conventional communication equipment as understood in the art. The communications can be analog and/or digital or both. Some further examples of wireless technologies that can be part of the wireless communication device 26 include digital cellular systems, Bluetooth systems, wireless LAN systems and/or dedicated short range communications (DSRC) systems (direct vehicle to vehicle communications).

DSRC (Dedicated Short-Range Communications) is a wireless communication technology that enables vehicles to communicate with each other and other road users directly, without involving cellular or other infrastructure.

The GPS device 28 (global positioning satellite device 28) can be any of a variety of GPS devices wherein location data is transmitted back and forth between the GPS satellite 18 and the GPS device 28 of the host vehicle 10. Such data can be transmitted and received several times per second. For example, most GPS systems transmit information at a rate of 10 times per second. Some GPS systems are such that information regarding the location of the remote vehicles 14 can be received by the host vehicle 10. Using changes location data (location information) of each of the remote vehicles 14 over time, the host vehicle 10 can determine heading and speed of each of the remote vehicles 14. In other words, based on changes in current location information transmitted at predetermined time intervals from the GPS satellite 18 can be used to determine or calculate changes in direction (changes in heading) and changes in speed. Small changes in direction can be correlated to frequency of steering angle of each of the remote vehicles 14.

The warning device 30 is described further herein below following a description of the operator interface 32.

The operator interface 32 can include, for example, a screen display 34 (also part of and/or serving as the warning device 30), an instrument panel 35, an audio speaker 46 and various manual input controls (not show) that are operatively coupled to the controller 24. The screen display 34 and the audio speaker 46 are examples of interior warning devices of a warning system that are used to alert a driver. The instrument panel 35 (shown in FIGS. 2 and 11) includes, for example, a speedometer 35a, a tachometer 35b, a text display 35c and the audio speaker 46. Of course, it will be apparent to those skilled in the art from this disclosure that interior warning devices include anyone of or a combination of visual, audio and/or tactile warnings as understood in the art that can be perceived inside the host vehicle 10. The host vehicle 10 also includes a steering wheel 48 to which a tactile warning can be transmitted as a warning device.

The warning device 30 is operated by the electronic controller 24 and can include one or more of the following: the text display 35c of the instrument panel 35, the screen display 34, the audio speaker 46 and/or a steering wheel 48 of the vehicle 10. As described further below, when the electronic controller 26 determines that a warning is necessary from the warning device 30, the warning device 30 is configured to issue one or more warnings to a vehicle operator (not shown) of the vehicle 10. The warning can be text and/or image information displayed on the screen display 34, text displayed on the text display 35c of the instrument panel 35, a verbal warning issued via the audio speaker 46 and/or vibration of the steering wheel 48 (a haptic warning) thereby alerting the vehicle operator of the presence (and optionally the relative location) of a remote vehicle 14 (14A) exhibiting questionable driving behavior. Further combinations of the above warnings can be employed. For example, the haptic warning (vibration of the steering wheel 48) can be used in combination with the warning displayed on the screen display 34, the text displayed on the text display 35c or the audio speaker 46. Other combination are also conceived.

The plurality of sensors 36, 38, 40 and 42 include can include the following: a speed sensor 36, an acceleration/deceleration sensor 38, a directional sensor 40 and a steering wheel angle sensor 42. It should be understood from the drawings and the description herein that the monitoring system 12 is not limited to inclusion of the speed sensor 36, the acceleration/deceleration sensor 38, the directional sensor 40 and the steering wheel angle sensor 42. Fewer sensors can be employed, or, additional sensors can be included. For example, the direction sensor 40 can be used to provide heading (direction) information of the transmitting vehicle (one of the remote vehicles 14 and the host vehicle 10) in order to determine the heading of the transmitting vehicle (one of the remote vehicles 14). In the event that the direction sensor 40 is omitted, heading information can be determined via data received over time via the GPS 28, if the transmitting vehicle allows such information to be transmitted to vehicles other than the transmitting vehicle. Additionally, if the steering wheel angle sensor 42 is not present, steering changes can also be determined from directional information provided via the GPS 28.

Further, in the event that the speed sensor 36 is omitted from the monitoring device 12 or 12' of one or more of the remote vehicles 14 and 14A, vehicle speed can be determined using information changes over time received by the GPS 28 of the transmitting vehicle. Similarly, if the acceleration/deceleration sensor 38 is omitted, changes in speed of the transmitting vehicle can also be determined by the host vehicle 10 for remote vehicle using operation information changes over time received by the GPS 28 of the transmitting vehicle (one or more of the remote vehicles 14 and 14A).

The speed sensor 36 of the monitoring system 12 can include a single sensor attached to, for example, the transmission (not shown) of the vehicle or can be wheel speed sensors, where speed of all four wheels or of an average speed of all four wheels can be transmitted from one of the remote vehicle 14 to the host vehicle 10. The wheel speed sensors can be either active such as hall effect sensors or passive such as variable reluctance sensors.

The acceleration/deceleration sensor 38 can be an accelerometer attached to the transmitting vehicle (one of the remote vehicles 14) or can be a sensor attached to throttle linkage or electronic controller of the transmitting vehicle. The steering wheel angle sensor 42 can be a steering angle sensor connected to the steering wheel 48 or can be a yaw rate sensor or sensors, or, can be sensors in the steering linkage that measure turning angle of the front wheels of the transmitting vehicle.

The radar/sonar device 44 includes conventional proximity sensors that transmit waves, for instance, sound waves or other types of waves, that bounce off nearby objects or vehicles providing a vehicle operator with immediate information regarding proximity of such objects or vehicles. Since proximity sensors are conventional devices, further description is omitted for the sake of brevity.

The vehicle driving behavior monitoring and warning system 12 (the monitoring system 12) operates when the vehicle 10 is being operated. Once the vehicle operator (not shown) has started the host vehicle 10, the monitoring system 12 begins receive operating information from other vehicles, such as the remote vehicles 14, that are located within the predetermined area about the host vehicle 10. For example, in the illustrated embodiment, the predetermined area can be defined by a circle with a radius of approximately 300 meter, with the host vehicle 10 being at the center of this circle. It should be understood from the drawings and the description herein that the 300 meter radius is not a fixed value but can change depending upon the speed of the host vehicle 10. For example, if the host vehicle 10 is traveling at 25 mph, the diameter of the circle defining the predetermined area can be smaller (i.e., a radius of 100-300 meters). If the host vehicle 10 is traveling at 65 mph, or faster, the diameter of the circle defining the predetermined area can be larger (i.e., a radius of 300-500 meters).

In the illustrated embodiment as shown schematically in FIGS. 12-17, the electronic controller 24 is programmed to define the predetermined area (the zone of interest) as being an area that extends from 300 meters forward of the host vehicle 10 to 300 meters rearward of the host vehicle 10. The electronic controller 24 also defines the predetermined area (the zone of interest) as being defined from at least 100 meters (or more) away from the driver's side of the host vehicle 10 to at least 100 meters (or more) away from the passenger's side of the host vehicle 10.

One limiting factor with respect to size of the predetermined area around the hose vehicle 10 is the transmitting and receiving capability of the host vehicle 10 and the remote vehicles 14. Specifically, when direct vehicle to vehicle communications C are used to send and receive BSM system, the wireless communication device 26 can limited to produce signal that can only be received by another communication device with a distance of 300 meters or less.

Once the monitoring system 12 begins receiving data from vehicle to vehicle communications, from GPS and/or from one or more of the communication units 20 relating to operating information of the remote vehicles 14 located within the predetermined area, the monitoring system 12 evaluates over time the operating behavior exhibited by each remote vehicle 14 within the predetermined area. As mentioned above, the monitoring system 12 evaluates operating behavior based on at least two of the following (or preferably all of the following) operating characteristics: magnitude and frequency of acceleration and deceleration; magnitude and frequency of braking operations; current speed of remote vehicle; and magnitude and frequency of steering corrections.

Using the operating information of each remote vehicle 14 within the predetermined area, the monitoring system 12 continuously evaluates the operating information from each remote vehicle 14. The monitoring system 12 saves the operating information and the results of the evaluating process in memory, and further continues to update the operating information and results of the evaluating as long as each of the remote vehicles 14 remain within the predetermined area (the zone of interest). If a new remote vehicle 14 enters the zone of interest, operating information from the new remote vehicle is automatically evaluated and the driving behavior of the new remote vehicle determined.

The evaluating of the operating information performed by the electronic controller 24 of the monitoring system determines the behavior characteristics exhibited by each of the remote vehicles 14. Specifically, the driving habits (driving behavior) of each vehicle operator is determined based upon the operating information of corresponding ones of the remote vehicles 14. For example, the evaluating of the magnitude and frequency of acceleration and deceleration of the first remote vehicle 14A by the monitoring system 12 can include how often in a predetermined time period such changes in acceleration and deceleration. If the changes in acceleration and deceleration are more frequent than a predetermined comparator number (at the current speed of the vehicles), and/or are far more frequent than changes in acceleration and deceleration of other nearby remote vehicles 14, the monitoring system 12 can put the first remote vehicle 14A onto a monitoring list indicating that the driving behavior exhibited by the first remote vehicle 14A could be questionable driving behavior and the monitoring system should continue to monitor the first remote vehicle 14A.

Further, if the changes in magnitude and frequency of braking operations of the first remote vehicle 14A are more frequent than a predetermined comparator number (at the current speed of the vehicles), and/or are far more frequent than changes in magnitude and frequency of braking operations of other remote vehicles 14, the monitoring system 12 can also put the first remote vehicle 14A onto the monitoring list indicating that monitoring of driving behavior exhibited by the first remote vehicle 14A should continue to be monitored.

As well, if the changes in the magnitude and frequency of steering corrections of the first remote vehicle 14A are more frequent than a predetermined comparator number (at the current speed of the vehicles), and/or are far more frequent than changes in the magnitude and frequency of steering corrections of other remote vehicles 14, the monitoring system 12 can also put the first remote vehicle 14A onto the monitoring list indicating that monitoring of driving behavior exhibited by the first remote vehicle 14A should continue to be monitored.

If operation of the first remote vehicle 14A exhibits no appreciable amount of questionable driving behavior characteristic, the monitoring system 12 can put the first remote vehicle 14A on a cleared list indicating that the first remote vehicle 14A poses little or no threat to the host vehicle 10. Remote vehicles on the cleared list are designated as remote vehicles 14 in FIGS. 12-17, As the host vehicle 10 continues to be driven, the heading (direction of travel) of each remote vehicle 14 is determined from the operating information. If the first remote vehicle 14A is on the monitor list and in on a heading that is close to or might coincide with the host vehicle 10, the first remote vehicle 14A can be moved by the monitoring system 12 to a threat list. If the remote vehicle 14 continues to be on a similar or the same heading as the host vehicle 10 for a predetermined amount of time, the monitoring system 12 determines that the first remote vehicle 14A continues to be a threat to the host vehicle 10 and a warning is issued by the monitoring system 12 to the vehicle operator of the host vehicle 10 alerting the vehicle operator of the host vehicle 10 of the presence and possible threat to the host vehicle 10.

The warning issued by the monitoring system 12 can be in the form of a computerized voice broadcasting a warning from the audio speaker 46 that indicates a possible threat due to the observed questionable driving operation of the first remote vehicle 14A. The voice broadcasted can include location and distance information such as a warning that a remote vehicle behind, to the right, to the left or in front of the host vehicle 10 is exhibiting unstable or questionable driving operations and should be avoided.

Figure 11:
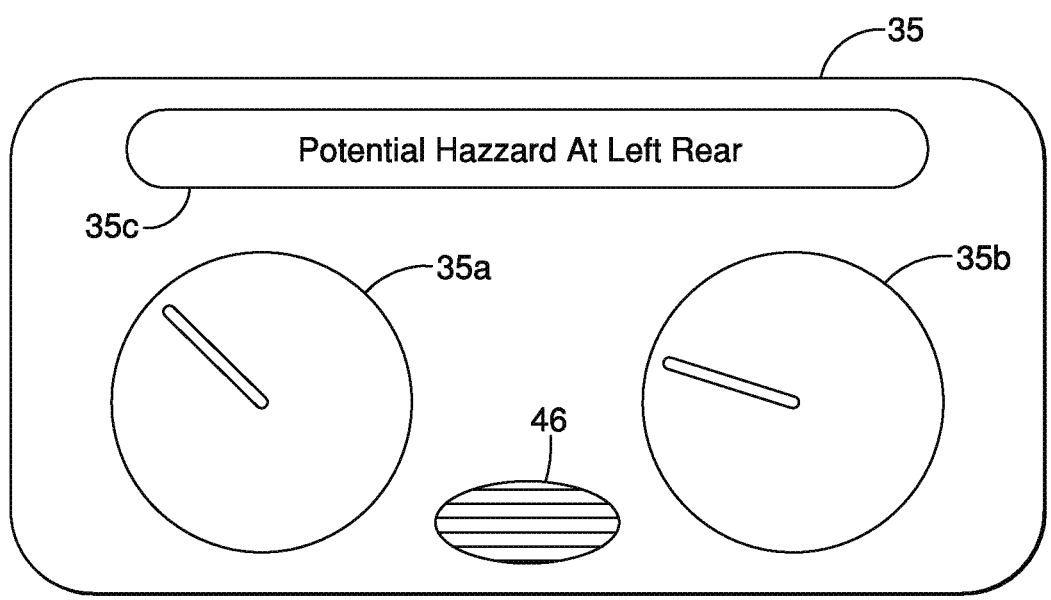
FIG. 11 is a schematic representation of an instrument panel of the host vehicle showing a text display, a speedometer, a tachometer and a speaker in accordance with the exemplary embodiment.

The warning issued by the monitoring system 12 can alternatively be in the form of a text message 35c of displayed on the instrument panel 35, as shown in FIG. 11.

In the illustrated embodiment, the warning issued by the monitoring system 12 can be provided on the visual display 34 in the form of a visual representation of the host vehicle 10, several remote vehicles 14 and the first remote vehicle 14A, as shown in FIGS. 12-17. In FIGS. 12-17, the first remote vehicle 14A is highlighted with shading around it but can alternatively be displayed in a different color from other remote vehicles 14 and the host vehicle 10.

Further, the warning can be a haptic warning in which the steering wheel 48 vibrates to get the attention of the vehicle operator of the host vehicle 10. The haptic warning can be used by itself, or, in combination with any one or all of the above described types of warnings.

Figure 3:
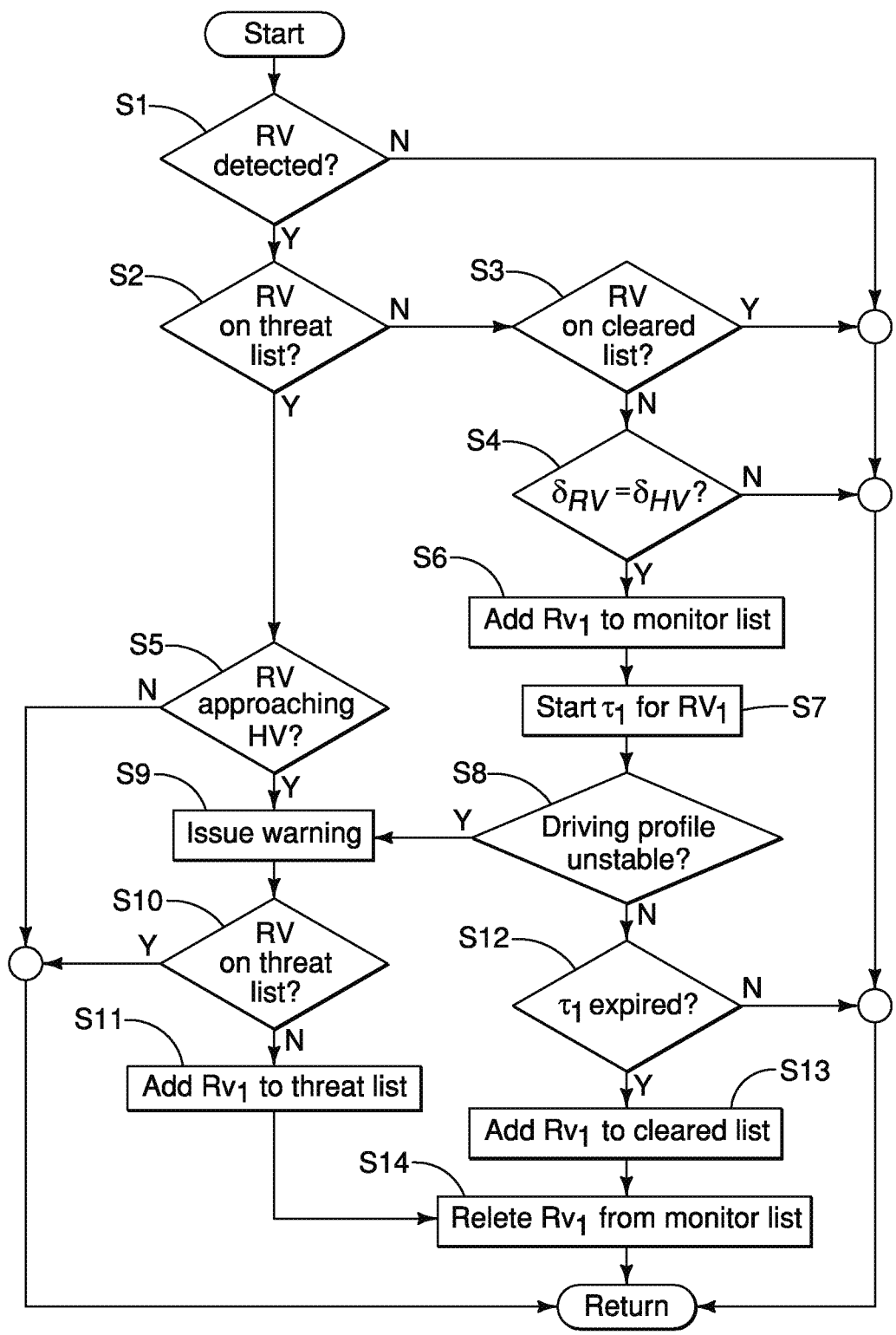
FIG. 3 is a first flowchart showing logic steps conducted during operation of the monitoring system in accordance with the exemplary embodiment.
Figure 4:
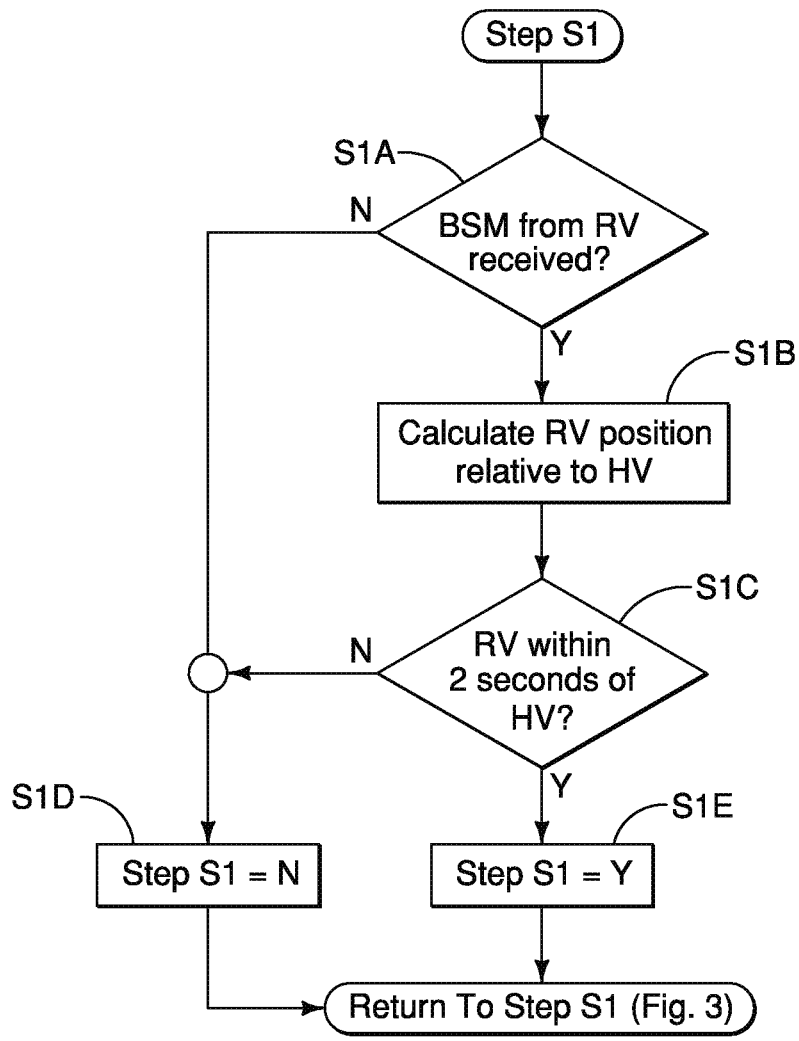
FIG. 4 is a second flowchart showing further logic steps conducted during operation of the monitoring system in accordance with the exemplary embodiment.
Figure 5:
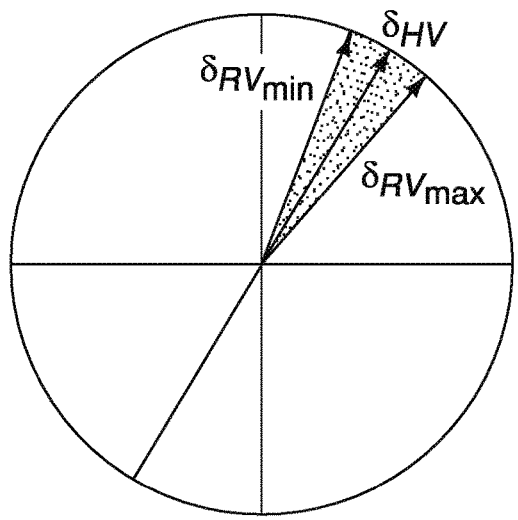
FIGS. 5-8 are diagrams showing representations of mathematical logic used to determine a remote vehicle's heading relative to a heading of the host vehicle relative to true north in accordance with the exemplary embodiment.
Figure 6:
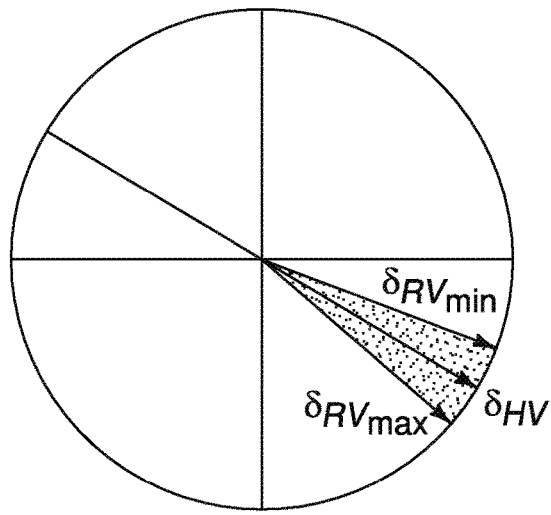
Figure 7:
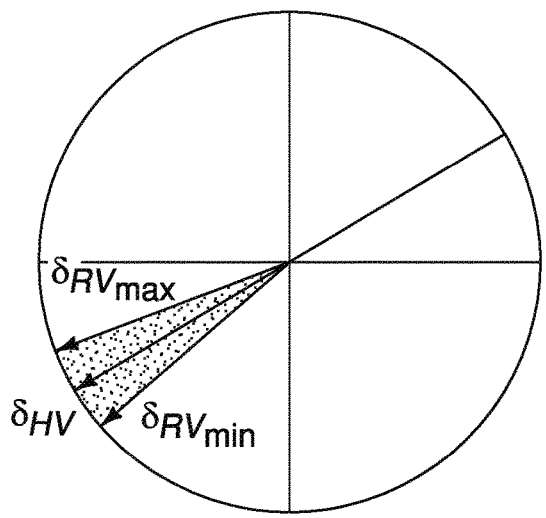
Figure 8:
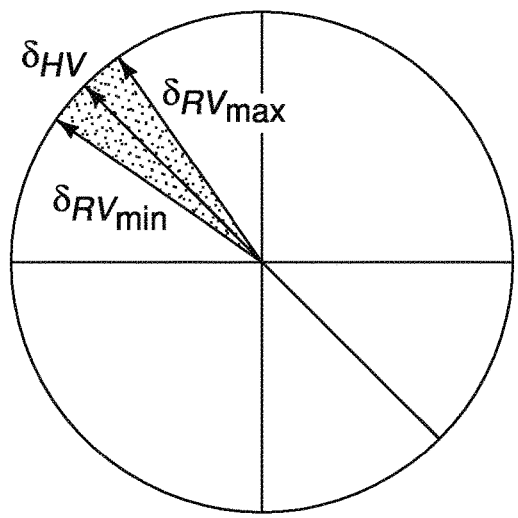

A description is now provided of the flowcharts in FIGS. 3 and 4 that show an example of logic representing one embodiment of a method of monitoring remote vehicles 14 (nearby vehicles) and warning the operator of the host vehicle 10 of possible threats posed by one or more of the remote vehicles within the above mentioned predetermined area, also referred to as a zone of interest.

As shown in FIG. 3, the monitoring system 12 starts with operation of the host vehicle 10. At step S1, the monitoring system 12 immediately begins to evaluate any, and all data (operating information) received by the communication device 26 and determines which of the remote vehicles 14 are within the zone of interest, and which of those vehicles currently with the zone of interest are also transmitting operating information. These determinations are shown in the flowchart depicted in FIG. 4.

Specifically, at step S1A in FIG. 4, the electronic controller 24 determines whether or not BSM or other operating data (i.e. GPS information) is being received from at least one remote vehicle 14 (in FIGS. 3 and 4 remote vehicles are abbreviated as "RV"). If no operating information or data is being received, operation moves to step S1D. If the communication device 26 and/or the GPS is receiving operating information from at least one remote vehicle 14 (RV), then operation moves to step S1B. At step S1B the position of the remote vehicle 14 relative to the host vehicle 10 is determined based upon the operating information for that remote vehicle 14. One example of the determination process is described herein below after the description of the flowcharts in FIGS. 3 and 4.

Next at step S1C, the electronic controller 24 determines whether or not the remote vehicle 14 is traveling in a manner such that the remote vehicle 14 is within 2 seconds of the host vehicle 10. If no, then operation moves to step S1D. If yes, then operation moves to step S1E.

At step S1D the decision of step S1 in FIG. 3 is "No". At step S1E, the decision of step S1 in FIG. 3 is "Yes". After either of step S1D and step S1E, operation returns to step S1 of FIG. 3.

At step S1 in FIG. 3, if the determination is "No" from FIG. 4 meaning that no remote vehicles have been detected, then operations move to the bottom of FIG. 3, and therefore return to the start of FIG. 3. If the determination is "Yes" meaning at least one remote vehicle has been detected within the zone of interest, then operation moves to step S2.

As step S2, a determination is made regarding the categorization of the remote vehicle 14. Specifically, if the remote vehicle 14 detected in FIG. 4 is on the threat list, then operation moves to step S5. If the remote vehicle 14 detected in FIG. 4 is not on the threat list, then operation moves to step S3. At step S3, a decision is made such that if the remote vehicle 14 is on the cleared list, operation moves to the bottom of FIG. 3 and returns. If the remote vehicle 14 is not on the cleared list, then operation moves to step S4. At step S4, a determination is made regarding the heading of the remote vehicle 14 as compared to the heading of the host vehicle 10. The determination of the heading is described in greater detail below following the description of the flowcharts in FIGS. 3 and 4.

If the determined heading $\delta_{RV}$ of the remote vehicle 14 is the not same as the determined heading $\delta_{HV}$ of the host vehicle 10, then operation moves to the bottom of the flowchart in FIG. 3 and returns to the top. At step S4, if the determined heading $\delta_{RV}$ of the remote vehicle 14 is the same as the determined heading $\delta_{HV}$ of the host vehicle 10, then at step S6 the remote vehicle 14 is designated as $R_{VI}$ and is added to the monitor list (aka the continue monitoring list). A description of the determination yielding the heading $\delta_{RV}$ of the remote vehicle 14 and the heading $\delta_{HV}$ of the host vehicle 10 is provided herein below following the description of the flowcharts in FIGS. 3 and 4.

Next, at step S7, a timer $\tau_i$ for $R_{VI}$ is started. At step S8, the current determinations of the continuing evaluations of the operating behavior (described above) of the remote vehicle $R_{VI}$ is accessed. If the operating behavior is currently determined as being questionable (driving profile unstable), operation moves step S9. If the operating behavior is currently determined as not being questionable (driving profile stable), then operation moves to Step S12.

At step S12, the timer $\tau_i$ for the remote vehicle $R_{VI}$ is checked. If a predetermined time period (for example, 1 minute) of the timer $\tau_i$ for remote vehicle $R_{VI}$ has been reached, operation moves to step S13 where the remote vehicle $R_{VI}$ is moved to the cleared list, no longer being considered a possible threat. Next, at step S14, the remote vehicle $R_{VI}$ removed from the monitor list (the continue monitoring list).

Returning to step S5, if the remote vehicle 14 of step S2 is approaching the host vehicle 10, at step S9, the electronic controller 26 operates the warning device 30 which issues a warning to the vehicle operator of the host vehicle 10. Similarly, if the driving profile $R_{VI}$ is determined to be unstable at step S8, at step S9, the electronic controller 26 operates the warning device 30, which issues a warning to the vehicle operator of the host vehicle 10. Various warnings issued by the warning device 30 are described in further detail below.

Next at step S10, a determination is made as to whether or not the remote vehicle 14 (RV) or the remote vehicle $R_{VI}$ is on the Remote Vehicle (RV) threat list. If not, at step S11, the remote vehicle 14 (RV) or the remote vehicle $R_{VI}$ is put on the Remote Vehicle (RV) threat list. If yes, then operation again moves to the bottom of the flowchart of FIG. 3 and returns to repeat.

Description is now provided of assumptions, reasoning and logic used in the illustrated embodiment shown in FIGS. 3 and 4.

It is desirable to know when the operator of a remote vehicle 14 (aka RV) that is in proximity to a host vehicle 10 (aka HV), is engaging in questionable driving behavior due to distraction or other causes. With this knowledge, the driver of the host vehicle 10 (HV) can take action to distance themselves from the remote vehicle 14 (RV) to minimize the chance of a possible adverse interaction.

Description is now provided of one example of the mathematical reasoning and logic used in the determining of the heading $\delta_{RV}$ of the remote vehicle 14 and the heading $\delta_{HV}$ of the host vehicle 10.

In the description below HV is an abbreviation for the host vehicle 10 and RV is an abbreviation of one of the remote vehicles 14. Other operators, such as RVi, are mathematical representations of a plurality of remote vehicle present in the zone of interest.

Are the HV and RV traveling in same direction (RQ=01)?

Remote Vehicle Heading angle as a function of Host Vehicle heading angle for the case of following vehicles can be defined as follows:

$$\delta_{RV} = \delta_{HV}$$

However, narrowly defining $\delta_{RV}$ to be exactly the same as $\delta_{HV}$ would result in a condition where the two vehicles would almost never be classified as heading in the same direction when in reality this condition is a very common occurrence. In order to account for small differences in heading angles, a variable $\varphi_2$ is used to define a range of heading angles for the RV in which the RV would be considered to be heading in the same direction as the HV. To define this range, the following expressions are defined:

Minimum RV Heading Angle

If $\delta_{RV} - \varphi_2 < 0$ then $\delta_{RV_{min}}^{01} = 2\pi + \delta_{RV} - \varphi_2$ If $\delta_{RV} - \varphi_2 \geq 0$ then $\delta_{RV_{min}}^{01} = \delta_{RV} - \varphi_2$ These conditions can be combined into one mathematical expression as:

$$\delta_{RV_{min}}^{01} = \frac{2\pi + \delta_{RV} - \varphi_2}{2}\left[\frac{0 - (\delta_{RV} - \varphi_2) - \sigma}{|0 - (\delta_{RV} - \varphi_2)| + \sigma} + 1\right] +$$

$$\frac{\delta_{RV} - \varphi_2}{2}\left[\frac{(\delta_{RV} - \varphi_2) - 0 + \sigma}{|(\delta_{RV} - \varphi_2) - 0| + \sigma} + 1\right]$$

These expressions have two values, 0 or 1 depending on the value of $\delta_{RV}$ and can be thought of as filtering functions that ensure the appropriate expression is used to calculate the value of the minimum RV heading angle.

Maximum RV Heading Angle

If $\delta_{RV} + \varphi_2 < 2\pi$ then $\delta_{RV_{max}}^{01} = \delta_{RV} + \varphi_2$ If $\delta_{RV} + \varphi_2 \geq 2\pi$ then $\delta_{RV_{max}}^{01} = \delta_{RV} + \varphi_2 - 2\pi$ These conditions can be combined into one mathematical expression as:

$$\delta_{RV_{max}}^{01} = \frac{\delta_{RV} + \varphi_2}{2}\left[\frac{2\pi - (\delta_{RV} + \varphi_2) - \sigma}{|2\pi - (\delta_{RV} + \varphi_2)| + \sigma} + 1\right] +$$

$$\frac{\delta_{RV} + \varphi_2 - 2\pi}{2}\left[\frac{(\delta_{RV} - \varphi_2) - 2\pi + \sigma}{|(\delta_{RV} - \varphi_2) - 2\pi| + \sigma} + 1\right]$$

These expressions have two values, 0 or 1 depending on the value of $\delta_{RV}$ and can be thought of as filtering functions that ensure the appropriate expression is used to calculate the value of the maximum RV heading angle.

Maximum RV Heading Angle

The RV is considered to be traveling in the same direction as the HV when the heading angle of the RV, $\delta_{RV}$ falls within the minimum and maximum RV heading angles therefore in most cases, the heading angle of the HV, $\delta_{HV}$ will be greater than or equal to the minimum RV heading angle and less than or equal to the maximum RV heading angle otherwise the RV will be considered to be traveling in a direction other than the same direction of the HV as shown in FIGS. 5-8.

Figure 9:
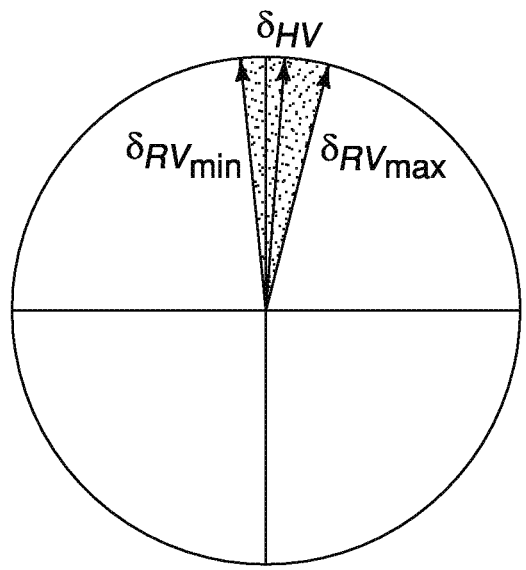
FIGS. 9 and 10 are diagrams showing representations of mathematical logic used to convert the heading of the remote vehicles to a representation that is oriented to relative to a heading of the host vehicle instead of the representation shown in FIGS. 5-8 in accordance with the exemplary embodiment.
Figure 10:
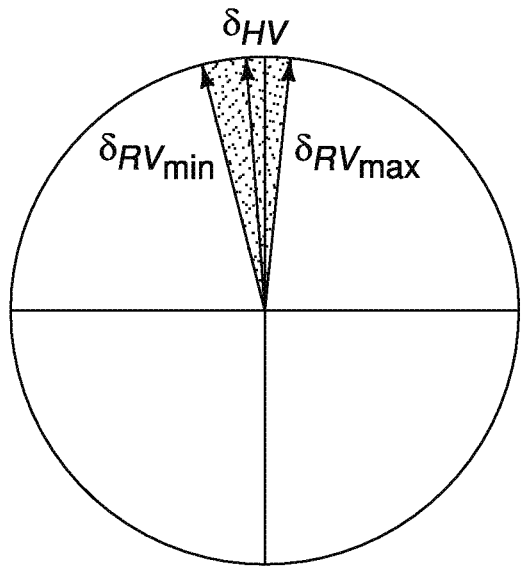

However, because of the fixed reference used where North=0°, there are cases where $\delta_{HV}$ will be less than or equal to the minimum RV heading angle and less than or equal to the maximum RV heading angle or cases where $\delta_{HV}$ will be greater than or equal to the minimum RV heading angle and greater than or equal to the maximum RV heading angle such as shown in FIGS. 9 and 10.

In FIG. 1: $\delta_{HV} < \delta_{RV_{min}}^{01}$ and $< \delta_{HV} < \delta_{RV_{max}}^{01}$
In FIG. 2: $\delta_{HV} > \delta_{RV_{min}}^{01}$ and $\delta_{HV} > \delta_{RV_{max}}^{01}$
Consider the following expressions for $H_1$ and $H_2$.

$H_1 = \delta_{HV} - \delta_{RV_{min}}^{01}$ $H_2 = \delta_{HV} - \delta_{RV_{max}}^{01}$ For any value of $\delta_{HV}$, the values for $H_1$ and $H_2$ fall within three distinct categories:

1: $H_1$ is negative, $H_2$ is negative and $H_1 < H_2$:

($\delta_{HV} < \delta_{RV_{min}}^{01}$ and $\delta_{HV} < \delta_{RV_{max}}^{01}$)

2: $H_1$ is positive, $H_2$ is negative and $H_1 > H_2$:

($\delta_{HV} > \delta_{RV_{min}}^{01}$ and $\delta_{HV} < \delta_{RV_{max}}^{01}$)

3: $H_1$ is positive, $H_2$ is positive and $H_1 < H_2$:

($\delta_{HV} > \delta_{RV_{min}}^{01}$ and $\delta_{HV} > \delta_{RV_{max}}^{01}$)

From these three conditions, it can be shown that for any combination of $\delta_{HV}$ and $\delta_{RV}$, where $0 \leq 2\delta_{HV} < 2\pi$ and $0 \leq \delta_{RV} < 2\pi$ the following expressions can be used to identify if the HV and RV are traveling in the same direction.

$$\Delta_1^{01} = \frac{1}{8}\left[1 - \frac{H_1 - H_2 - \sigma}{|H_1 - H_2| + \sigma}\right] \times \left[\frac{\delta_{RV_{min}}^{01} - \delta_{RV} + \sigma}{\left|\delta_{RV_{min}}^{01} - \delta_{RV}\right| + \sigma} + 1\right] \times$$

$$\left[\frac{\delta_{RV_{max}}^{01} - \delta_{RV} - \sigma}{\left|\delta_{RV_{max}}^{01} - \delta_{RV}\right| + \sigma} + 1\right]$$

The expression above states that:

$\Delta_1^{01} = 1$ when $H_1 < H_2$ and $\delta_{RV} \leq \delta_{RV_{min}}^{01}$ and $\delta_{RV} < \delta_{RV_{max}}^{01}$ Otherwise $\Delta_1^{01} = 0$.

$$\Delta_2^{01} = \frac{1}{8}\left[\frac{H_1 - H_2 - \sigma}{|H_1 - H_2| + \sigma} + 1\right] \times \left[\frac{\delta_{RV} - \delta_{RV_{min}}^{01} + \sigma}{\left|\delta_{RV} - \delta_{RV_{min}}^{01}\right| + \sigma} + 1\right] \times$$

$$\left[\frac{\delta_{RV_{max}}^{01} - \delta_{RV} - \sigma}{\left|\delta_{RV_{max}}^{01} - \delta_{RV}\right| + \sigma} + 1\right]$$

The expression above states that:

$\Delta_2^{01} = 1$ when $H_1 > H_2$ and $\delta_{RV_{min}}^{01} \leq \delta_{RV} < \delta_{RV_{max}}^{01}$ Otherwise $\Delta_2^{01} = 0$.

$$\Delta_3^{01} = \frac{1}{8}\left[1 - \frac{H_1 - H_2 - \sigma}{|H_1 - H_2| + \sigma}\right] \times \left[\frac{\delta_{RV} - \delta_{RV_{min}}^{01} + \sigma}{\left|\delta_{RV} - \delta_{RV_{min}}^{01}\right| + \sigma} + 1\right] \times$$

$$\left[\frac{\delta_{RV} - \delta_{RV_{max}}^{01} - \sigma}{\left|\delta_{RV} - \delta_{RV_{max}}^{01}\right| + \sigma} + 1\right]$$

The expression above states that:

$\Delta_3^{01} = 1$ when $H_1 < H_2$ and $\delta_{RV} \leq \delta_{RV_{min}}^{01}$ and $\delta_{RV} < \delta_{RV_{max}}^{01}$ Otherwise $\Delta_3^{01} = 0$.

Also, it is advantageous to define the difference of $H_1$ and $H_2$ as follows:

$H_1 - H_2 = \delta_{HV} - \delta_{RV_{min}}^{01} - (\delta_{HV} - \delta_{RV_{max}}^{01})$ Simplifying results in:

$H_1 - H_2 = \delta_{RV_{max}}^{01} - \delta_{RV_{min}}^{01}$

Then the previous expressions can be expressed as:

$$\Delta_1^{01} = \frac{1}{8}\left[1 - \frac{\delta_{RV_{max}}^{01} - \delta_{RV_{min}}^{01} - \sigma}{\left|\delta_{RV_{max}}^{01} - \delta_{RV_{min}}^{01}\right| + \sigma}\right] \times \left[\frac{\delta_{RV_{min}}^{01} - \delta_{RV} + \sigma}{\left|\delta_{RV_{min}}^{01} - \delta_{RV}\right| + \sigma} + 1\right] \times$$

$$\left[\frac{\delta_{RV_{max}}^{01} - \delta_{RV} - \sigma}{\left|\delta_{RV_{max}}^{01} - \delta_{RV}\right| + \sigma} + 1\right]$$

$$\Delta_2^{01} = \frac{1}{8}\left[\frac{\delta_{RV_{max}}^{01} - \delta_{RV_{min}}^{01} - \sigma}{\left|\delta_{RV_{max}}^{01} - \delta_{RV_{min}}^{01}\right| + \sigma} + 1\right] \times \left[\frac{\delta_{RV} - \delta_{RV_{min}}^{01} + \sigma}{\left|\delta_{RV} - \delta_{RV_{min}}^{01}\right| + \sigma} + 1\right] \times$$

$$\left[\frac{\delta_{RV_{max}}^{01} - \delta_{RV} - \sigma}{\left|\delta_{RV_{max}}^{01} - \delta_{RV}\right| + \sigma} + 1\right]$$

-continued $$\Delta_3^{01} = \frac{1}{8}\left[1 - \frac{\delta_{RV_{max}}^{01} - \delta_{RV_{min}}^{01} - \sigma}{|\delta_{RV_{max}}^{01} - \delta_{RV_{min}}^{01}| + \sigma}\right] \times \left[\frac{\delta_{RV} - \delta_{RV_{min}}^{01} + \sigma}{|\delta_{RV} - \delta_{RV_{min}}^{01}| + \sigma} + 1\right] \times$$

$$\left[\frac{\delta_{RV} - \delta_{RV_{max}}^{01} - \sigma}{|\delta_{RV} - \delta_{RV_{max}}^{01}| + \sigma} + 1\right]$$

If the sum of these three expressions is equal to 1, the HV and RV are traveling in the same direction. This condition is expressed mathematically as:

$$\sum_{i=1}^{3} \Delta_i^{01} = 1 (RQ = 01)$$

Thus:

$$r_i = \sum_{i=1}^{3} \Delta_i^{01} \times 0$$

$$q_i = \sum_{i=1}^{3} \Delta_i^{01} \times 1$$

Is the RV approaching the HV?

The monitoring system 12 on board the host vehicle 10 determines whether $RV_i$ are (is) approaching the HV by calculating the relative distance between HV and $RV_i$ according to the following expression:

$$D = (1-f)r_e\sqrt{\frac{(\theta_{RV} - \theta_{HV})^2\cos^2\phi_{HV} + (\phi_{RV} - \phi_{HV})^2}{\sin^2\phi_{HV} + (1-f)^2\cos^2\phi_{HV}}}$$

Where:
D=the instantaneous distance between HV and RV
f=1/298.257223563 (earth flattening)
$r_e$=6,378,137 m (earth equatorial radius)
$q_{HV}$=HV longitude
$f_{HV}$=HV latitude
$q_{RV}$=RV longitude
$f_{RV}$=RV latitude Referring back to the flowchart in FIG. 3, if the distance is decreasing, RVi is approaching the HV. If $RV_i$ is approaching the HV, the system on board the vehicle proceeds to step S4 in FIG. 3, otherwise operational control moves to the bottom of the flowchart in FIG. 3, and, back to the beginning of the process flow.

Add RV to the Monitor List

As mentioned above, in FIG. 3 at steps S6 and S7, the monitoring system 12 starts a timer $t_i$ for $RV_i$. The monitoring system 12 maintains unique timers for each $RV_i$ (remote vehicle) where i=1 to some maximum value such as, for example, 16. In other words, in the depicted embodiment, the monitoring system 12 can monitor up to 16 remote vehicles 14 located within the zone of interest.

The warning issued at step S9 in the flowchart depicted in FIG. 3, can take any of a variety of forms. For example, if the monitoring system 12 is provided with the instrument panel 35 where the text display 35c serves as the warning device, then a text is displayed warning of a potential hazard from one of the remote vehicles 14. Based on the operating information evaluated by the electronic controller 24, the electronic controller 24 also displays the relative location of the remote vehicle 14 that is the potential hazard (the vehicle exhibiting questionable driving behavior). For example, the text displayed can state that the potential hazard is to the left and rear of the host vehicle 10, as shown in FIG. 11. The electronic controller 24 can also state that the potential hazard is left and forward, right and rearward, right and forward, directly forward or directly rearward to warn the operator of the host vehicle 10. Additionally, a haptic warning can accompany the text image wherein the electronic controller 24 operates a vibration device attached to the steering column or steering wheel 48 of the host vehicle 10.

In the illustrated embodiment, the monitoring system 12 includes the visual display 34 and is part of the warning device 30. The electronic controller 24 has determined that the first remote vehicle 14A poses a potential threat to the host vehicle 10 and has determined the location of the first remote vehicle 14A relative to the host vehicle 10. Therefore, the warning issued at step S9 of the flowchart in FIG. 3 can be in the form of a schematic visualization of the host vehicle 10 (at approximate center of the visual display 34) along with remote vehicles 14 and the first remote vehicle 14A depicted in locations relative to the host vehicle 10.

As shown in FIGS. 12-17, the first remote vehicle 14A can be displayed with shading or highlighting around it or can be shown on the visual display 34 in a color different that the host vehicle 10 and the other remote vehicles 14.

Figure 12:
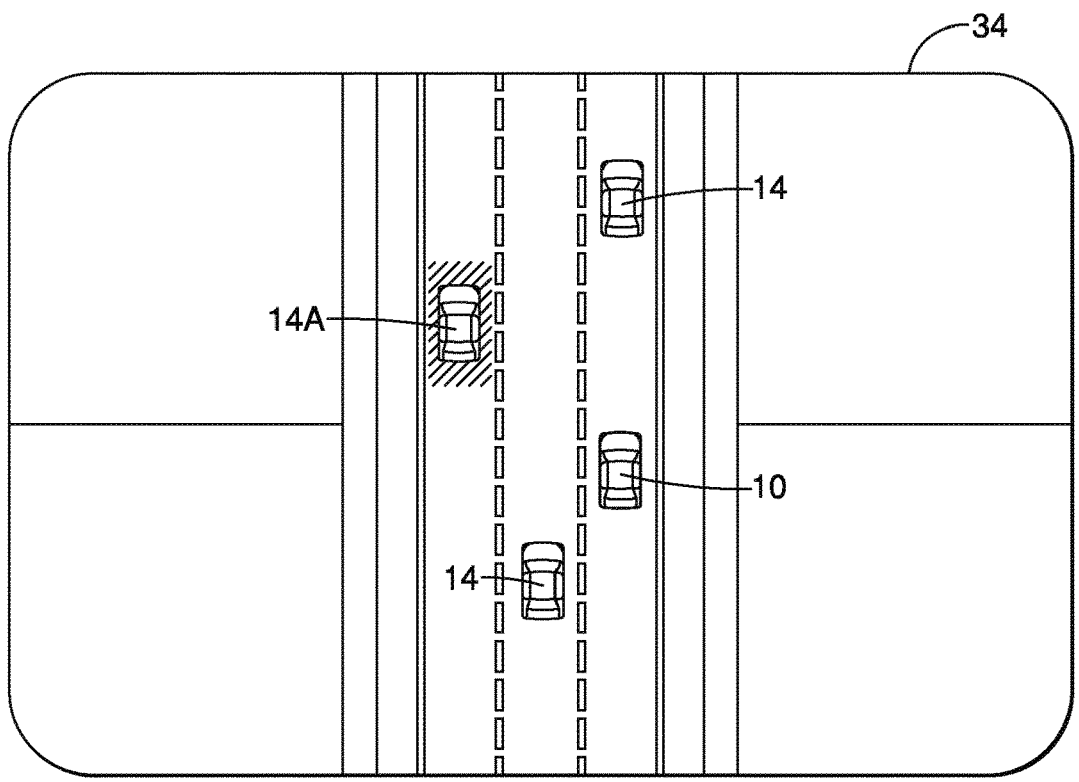
FIG. 12 is a schematic representation of a visual display of the host vehicle depicting the host vehicle near the center of the visual display, depicting a highlighted remote vehicle that has exhibited questionable behavior and depicting the highlighted remote vehicle forward of and in a lane to the left of the host vehicle in accordance with the exemplary embodiment.

In FIG. 12, the electronic controller 24 has determined that the first remote vehicle 14A is a potential hazard and has further determined that the first remote vehicle 14A is in a lane to the left and forward of the host vehicle 10. FIG. 12 displays the first remote vehicle 14A in the lane to the left and forward of the host vehicle 10 in the visual display 34.

Figure 13:
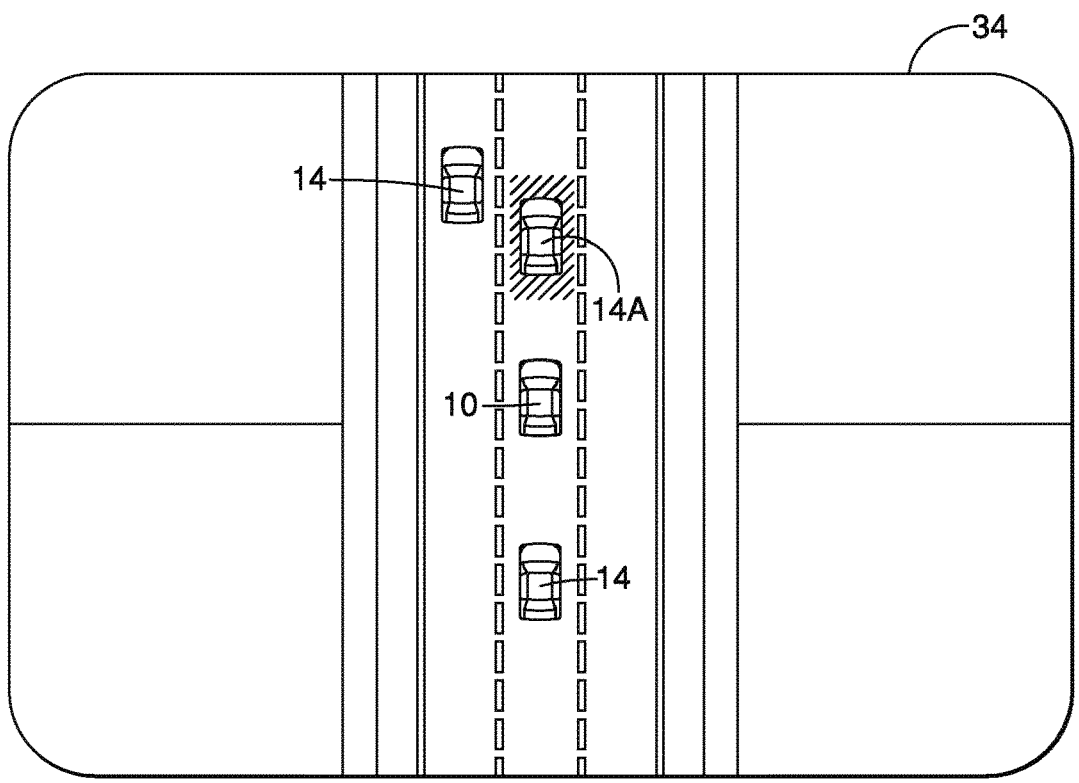
FIG. 13 is a schematic representation of the visual display of the host vehicle depicting the host vehicle near the center of the visual display, depicting a highlighted remote vehicle that has exhibited questionable behavior and depicting the highlighted remote vehicle forward of and in same lane as the host vehicle in accordance with the exemplary embodiment.

In FIG. 13, the electronic controller 24 has determined that the first remote vehicle 14A is a potential hazard and has further determined that the first remote vehicle 14A is in the same lane and is in front of the host vehicle 10. FIG. 13 displays the first remote vehicle 14A in the same lane and in front of the host vehicle 10 in the visual display 34.

Figure 14:
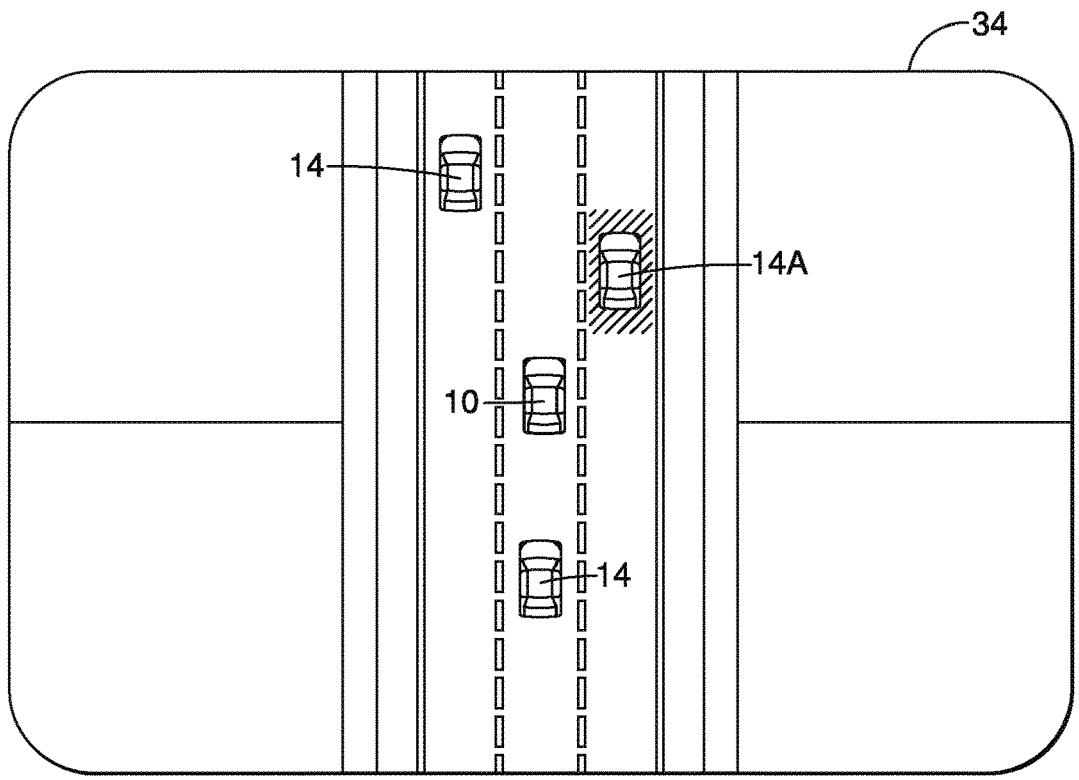
FIG. 14 is a schematic representation of a visual display of the host vehicle depicting the host vehicle near the center of the visual display, depicting a highlighted remote vehicle that has exhibited questionable behavior and depicting the highlighted remote vehicle forward of and in a lane to the right of the host vehicle in accordance with the exemplary embodiment.

In FIG. 14, the electronic controller 24 has determined that the first remote vehicle 14A is a potential hazard and has further determined that the first remote vehicle 14A is in a lane to the right and forward of the host vehicle 10. FIG. 14 displays the first remote vehicle 14A in the lane to the right and forward of the host vehicle 10 in the visual display 34.

Figure 15:
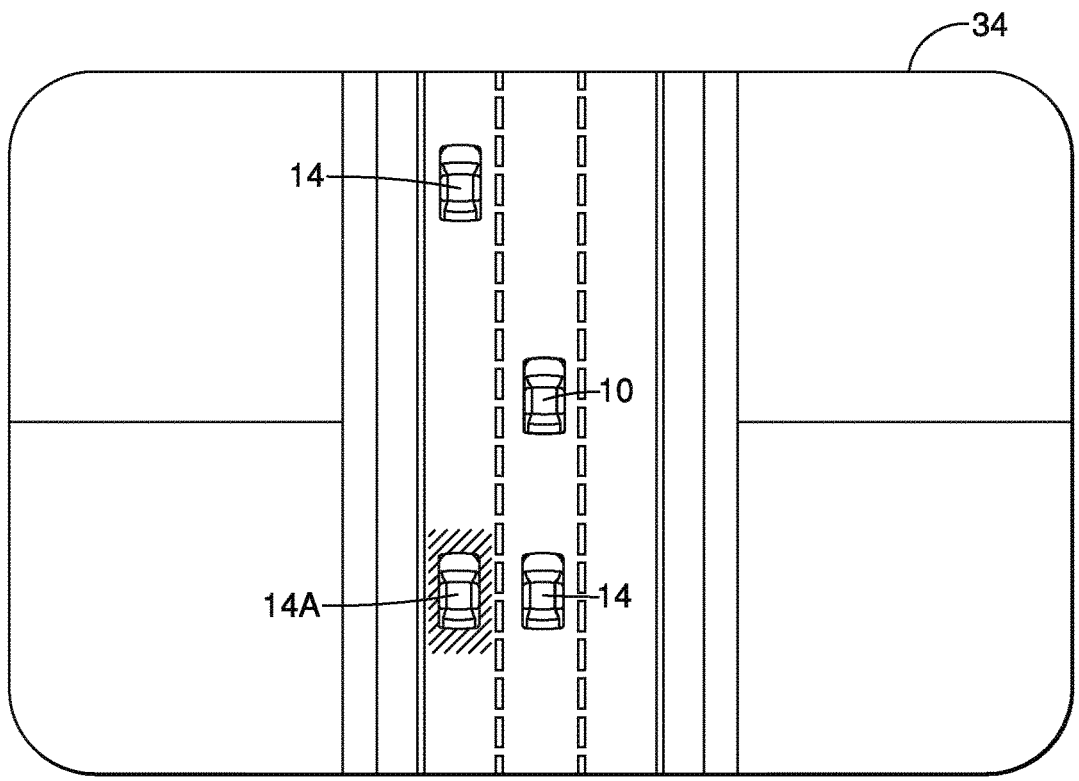
FIG. 15 is a schematic representation of the visual display of the host vehicle depicting the host vehicle near the center of the visual display, depicting a highlighted remote vehicle that has exhibited questionable behavior and depicting the highlighted remote vehicle rearward of and in a lane to the left of the host vehicle in accordance with the exemplary embodiment.

In FIG. 15, the electronic controller 24 has determined that the first remote vehicle 14A is a potential hazard and has further determined that the first remote vehicle 14A is in a lane to the left and rearward of the host vehicle 10. FIG. 15 displays the first remote vehicle 14A in the lane to the left and rearward of the host vehicle 10 in the visual display 34.

Figure 16:
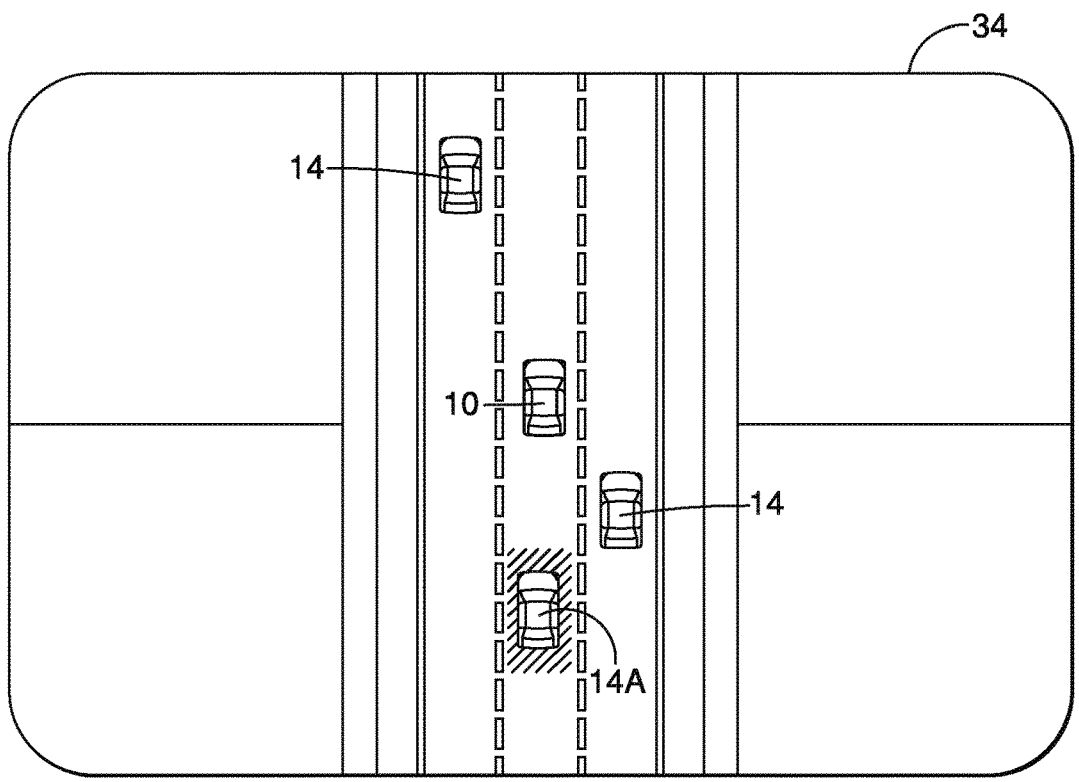
FIG. 16 is a schematic representation of the visual display of the host vehicle depicting the host vehicle near the center of the visual display, depicting a highlighted remote vehicle that has exhibited questionable behavior and depicting the highlighted remote vehicle rearward of and in same lane as the host vehicle in accordance with the exemplary embodiment.

In FIG. 16, the electronic controller 24 has determined that the first remote vehicle 14A is a potential hazard and has further determined that the first remote vehicle 14A is in the same lane and is rearward of the host vehicle 10. FIG. 16 displays the first remote vehicle 14A in the same lane and rearward of the host vehicle 10 in the visual display 34.

Figure 17:
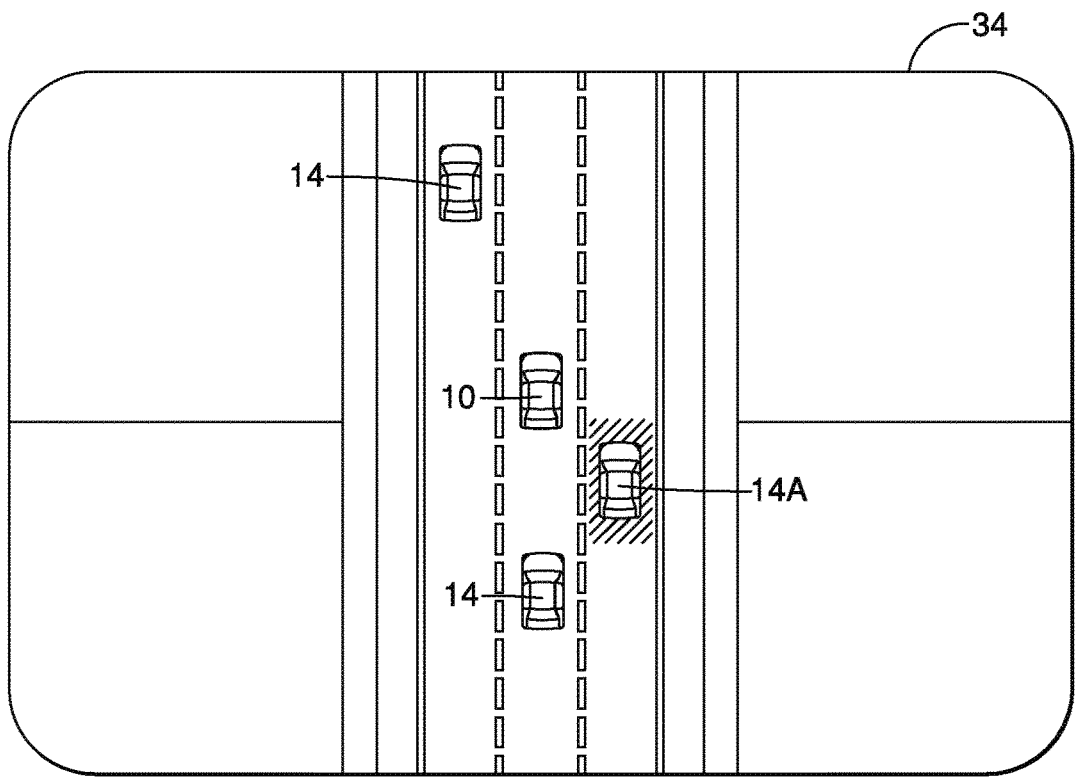
FIG. 17 is a schematic representation of a visual display of the host vehicle depicting the host vehicle near the center of the visual display, depicting a highlighted remote vehicle that has exhibited questionable behavior and depicting the highlighted remote vehicle rearward of and in a lane to the right of the host vehicle in accordance with the exemplary embodiment.

In FIG. 17, the electronic controller 24 has determined that the first remote vehicle 14A is a potential hazard and has further determined that the first remote vehicle 14A is in a lane to the right and rearward of the host vehicle 10. FIG. 17 displays the first remote vehicle 14A in the lane to the right and rearward of the host vehicle 10 in the visual display 34.

Alternatively, the audio speaker 46 shown in FIG. 11 can be serve as the warning device issuing verbal warnings corresponding to each of the warnings depicted in FIGS. 12-17.

The various features of the vehicle 10 other than the monitoring system 12 are conventional components that are well known in the art. Since the various features of the vehicle 10 are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the monitoring system 12. Accordingly, these terms, as utilized to describe the present invention should be interpreted relative to a vehicle equipped with the monitoring system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle driving behavior monitoring and warning system, comprising:

a host vehicle having a communication device configured to receive operating information of remote vehicles located within a predetermined zone of interest defined relative to the host vehicle;

a warning device within the host vehicle operable to provide warnings to an operator of the host vehicle; and an electronic controller of the host vehicle connected to the communication device and the warning device, the electronic controller being configured to evaluate operating information received by the communication device and determine whether or not one of the remote vehicles is being operated with questionable driving behavior and configured to determine whether or not the one of the remote vehicles poses a potential threat to the host vehicle, and, in response to determining that the one of the remote vehicles is being operated with questionable driving behavior and poses a potential threat to the host vehicle, the electronic controller operates the warning device warning the operator of the host vehicle of the one of the remote vehicles, and the electronic controller is further configured to categorize each remote vehicle within the zone of interest into one of three categories, including a cleared category, a continue monitoring category and a potential threat category, wherein the electronic controller lists one or more of the remote vehicles in the cleared category in response to determining that one or more of the remote vehicles poses/pose little or no potential threat to the host vehicle, the electronic controller lists one or more of the remote vehicles in the continue monitoring category in response to determining that one or more of the remote vehicles is/are moving in a similar or the same heading as the host vehicle and exhibits occasional questionable driving behavior, and the electronic controller lists one or more of the remote vehicle in the potential threat category in response to the electronic controller determining that the remote vehicle exhibits continuing questionable driving behavior and is traveling on a similar or intersecting heading as the host vehicle within the zone of interest.

2. The vehicle driving behavior monitoring and warning system according to claim 1, wherein the warning device comprises a visual display, and the electronic controller is connected to the visual display such that in response to determining that the one of the remote vehicles is being operated with questionable driving behavior and poses a potential threat to the host vehicle, the electronic controller operates the warning device to display location of the one of the remote vehicles relative to the host vehicle.

3. The vehicle driving behavior monitoring and warning system according to claim 1, wherein the warning device includes one of an audio device or a text displaying device, and the electronic controller is connected to the at least one of the audio device or the text displaying device such that in response to determining that the one of the remote vehicles is being operated with questionable driving behavior and poses a potential threat to the host vehicle, the electronic controller operates the warning device to alert the operator of the host vehicle of the presence of the one of the remote vehicles.

4. The vehicle driving behavior monitoring and warning system according to claim 1, wherein the operating information of remote vehicles received by the communication device includes data corresponding to at least two of the following:

magnitude and frequency of acceleration of remote vehicles, magnitude and frequency of braking operations of remote vehicles, current speed of remote vehicles, and magnitude and frequency of steering corrections of remote vehicles.

5. The vehicle driving behavior monitoring and warning system according to claim 1, wherein the electronic controller of the host vehicle is configured to:

evaluate operating information received by the communication device in order to categorize driving behavior of each of the remote vehicles located within the predetermined zone of interest;

determine whether or not a first remote vehicle is being operated with questionable driving behavior;

determining whether or not the first remote vehicle poses a potential threat to the host vehicle, and, in response to determining that the first remote vehicle is being operated with questionable driving behavior and determining that the first remote vehicle poses a potential threat to the host vehicle, the electronic controller operates the warning device informing the operator of the host vehicle that the first remote vehicle is being operated with the questionable driving behavior and is a potential threat to the host vehicle.

6. The vehicle driving behavior monitoring and warning system according to claim 1, wherein the electronic controller is configured such that in response to determining that a first vehicle of the remote vehicles is moving in a similar or intersecting heading as the host vehicle, the electronic controller evaluates at least two of the following: magnitude and frequency of acceleration of the first vehicle; magnitude and frequency of braking operation of the first vehicle; current speed of the first remote vehicle; and magnitude and frequency of steering corrections of the first remote vehicle when determining whether or not the first vehicle is currently exhibiting occasional questionable driving behavior.

7. The vehicle driving behavior monitoring and warning system according to claim 1, wherein the electronic controller defines the zone of interest as being an area that extends from 300 meters forward of the host vehicle to 300 meters rearward of the host vehicle.

8. The vehicle driving behavior monitoring and warning system according to claim 1, wherein the wireless communication device includes at least one of the following: a dedicated short range communication system (DSRC); and a global positioning satellite system (GPS).

9. A vehicle questionable driving behavior warning system, comprising:

a wireless communication device configured to receive operating information of remote vehicles located within a predetermined zone of interest defined relative to a host vehicle;

a warning device within the host vehicle configured to selectively provide warnings to an operator of the host vehicle; and an electronic controller of the host vehicle connected to the wireless communication device and the warning device, the electronic controller configured to:

evaluate operating information received by the communication device in order to categorize driving behavior of each of the remote vehicles located within the predetermined zone of interest;

determine whether or not a first remote vehicle of the remote vehicles is being operated with questionable driving behavior;

determining whether or not the first remote vehicle poses a potential threat to the host vehicle, and, in response to determining that the first remote vehicle is being operated with questionable driving behavior and determining that the first remote vehicle poses a potential threat to the host vehicle, the electronic controller operates the warning device informing the operator of the host vehicle that the first remote vehicle is being operated with the questionable driving behavior and is a potential threat to the host vehicle, and the electronic controller further categorizes the driving behavior of each remote vehicle within the zone of interest into one of three categories, including a cleared category, a continue monitoring category and a potential threat category, wherein the electronic controller lists remote vehicles in the cleared category in response to determining that one or more of the remote vehicles pose/poses little or no potential threat to the host vehicle, the electronic controller lists remote vehicle in the continue monitoring category in response to determining that one or more of the remote vehicles is/are moving in a similar or the same heading as the host vehicle and exhibits occasional questionable driving behavior, and the electronic controller lists a remote vehicle in the potential threat category in response to the electronic controller determining that the remote vehicle exhibits continuing questionable driving behavior and is traveling on a similar or the same heading as the host vehicle.

10. The vehicle driving behavior monitoring and warning system according to claim 9, wherein the electronic controller is configured such that in response to determining that the first remote vehicle is moving in a similar or intersecting heading as the host vehicle, the electronic controller evaluates data corresponding to at least two of the following: magnitude and frequency of acceleration of the first vehicle; magnitude and frequency of braking operation of the first vehicle; current speed of the first remote vehicle; and magnitude and frequency of steering corrections of the first remote vehicle when determining whether or not the first vehicle is currently exhibiting occasional questionable driving behavior.

11. The vehicle driving behavior monitoring and warning system according to claim 9, wherein the operating information of remote vehicles received by the communication device and evaluated by the electronic controller includes evaluating data corresponding to at least two of the following:

magnitude and frequency of acceleration and deceleration, magnitude and frequency of braking operations, current speed of remote vehicle, and magnitude and frequency of steering corrections.

12. The vehicle driving behavior monitoring and warning system according to claim 9, wherein the warning device comprises a visual display, and the electronic controller is connected to the visual display such that in response to determining that the first remote vehicle is being operated with questionable driving behavior and poses a potential threat to the host vehicle, the electronic controller operates the warning device to display location of the first remote vehicle relative to the host vehicle.

13. The vehicle driving behavior monitoring and warning system according to claim 9, wherein the warning device includes one of an audio device or a text displaying device, and the electronic controller is connected to the at least one of the audio device or the text displaying device such that in response to determining that the first remote vehicle is being operated with questionable driving behavior and poses a potential threat to the host vehicle, the electronic controller operates the warning device to alert the operator of the host vehicle of the presence of the first remote vehicle.

14. The vehicle driving behavior monitoring and warning system according to claim 9, wherein the electronic controller defines the zone of interest as being an area that extends from 300 meters forward of the host vehicle to 300 meters rearward of the host vehicle.

15. The vehicle driving behavior monitoring and warning system according to claim 9, wherein the wireless communication device includes at least one of the following: a dedicated short range communication system (DSRC); and a global positioning satellite system (GPS).

* * * * *